Patented Oct. 26, 1954

2,692,890

UNITED STATES PATENT OFFICE 2,692,890

PROCESS FOR PRODUCING DIALKYL PHOSPHITES

Paul W. Gann and Rudolph L. Heider, Dayton, Ohio, assignors to Monsanto Chemical Company, St. Louis, Mo., a corporation of Delaware No Drawing. Application October 20, 1949, Serial No. 122,584

9 Claims. (Cl. 260—461)

This invention relates to a new process for producing dialkyl phosphites.

This invention has for its object the provision of an improved process for producing dialkyl phosphites by the reaction between an aliphatic alcohol and phosphorus trichloride.

In prior processes for producing dialkyl phosphites it is customary to react three moles of an aliphatic alcohol with phosphorus trichloride either in the presence or absence of a solvent or diluent. P. Nylen, Ber. 57, 1029; Arbusov, Ber. 62, 1873. The hydrogen chloride and alkyl chloride formed during the reaction was usually removed by applying a reduced pressure or by sweeping the reaction mass with an inert gas. Such prior processes were more suited to laboratory preparations than to commercial manufacturing scale operations.

We have now discovered that if the alcohol and phosphorus trichloride be combined in the presence of a boiling and refluxing normally liquid inert solvent under conditions such that the reaction occurs at a temperature above 30° C., but below 150° C., a good yield of dialkyl phosphite may be obtained practically instantaneously, and moreover the HCl and any alkyl chloride normally liberated by the reaction may be readily recovered.

In view of the instantaneous nature of the reaction, when carried out according to this invention, the process may be practiced on a commercial scale with simplified apparatus. The reaction may be carried out without refrigeration, thereby considerably cheapening the manufacturing plant required. Further simplification results from the fact that the hydrogen chloride and alkyl chlorides are obtained directly at or above atmospheric pressure, making possible the utilization of simplified recovery means for obtaining these by-products in usable form. For the present purpose any monohydric aliphatic primary or secondary alcohol or mixture thereof may be employed. As examples of suitable alcohols which may be used in our process we may mention the following: methyl, ethyl, n-propyl, isopropyl, n-butyl, isobutyl, n-amyl, isoamyl, n-hexyl, 2-ethyl butyl, n-octyl, 2-ethyl hexyl, nonyl, decyl, lauryl, 2-methyl pentanol-1, etc. The alcohols used in our process may be anhydrous or they may contain water.

The dialkyl phosphite product produced from those alcohols having less than 6 carbon atoms in the alkyl group may generally be distilled under reduced pressure without decomposition. The products produced from the alcohols having in excess of 5 carbon atoms, by reason of their high boiling points may not generally be distilled without decomposition and in this event they are recovered in a form sufficiently pure by washing the product with dilute caustic soda, followed by water. The addition of a liquid hydrocarbon, such as hexane to the wet product at this point, followed by azeotropic distillation of the hydrocarbon and water gives a substantially pure product.

While generally any normally liquid, inert solvent boiling above 30° C., but below 150° C., at atmospheric pressure, may be used in the process, it is preferred that an inert solvent having a boiling point at standard conditions above 50° C., but below 80° C., be used. During the process, the inert solvent is boiled under conditions of total reflux and the reactants added thereto in any desired order. The inert solvent may comprise chlorinated hydrocarbons, aromatic or aliphatic hydrocarbons, cycloaliphatic hydrocarbons or mixtures thereof. The hydrogen chloride, together with any volatile alkyl chloride which may be formed, is volatilized and removed from the reaction zone. When the alkyl chloride formed has a high boiling point, the hydrogen chloride is removed first, after which the higher boiling alkyl chloride and the dialkyl phosphite may be separated by distilling the former product.

The reaction occurring under anhydrous conditions may be written as follows:

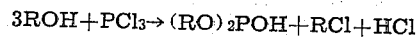

in which case the theoretical yield of the dialkyl phosphite is one-third mole per mole of alcohol.

When working according to the present invention, it is possible to employ not only anhydrous alcohol, but also alcohol-water mixtures, provided that the water content of such mixtures is not in excess of one mole of water per mole of PCl₃ employed in the reaction. The use of alcohol-water mixtures in the process results in the formation of a greater proportion of HCl and a smaller proportion of alkyl chloride. Thus, in theory, when employing one mole of water and two moles of alcohol per mole of PCl₃ in the reaction mixture in the presence of a refluxing inert solvent, the reaction should result in the formation of three moles of HCl and none, or very little, alkyl chloride. This reaction may be written as follows:

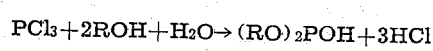

from which it is apparent that theoretically 0.5 mole of dialkyl phosphite is formed per mole of alcohol.

The use of alcohol-water mixtures for the preparation of dialkyl phosphites is more fully described and claimed in application Serial No. 122,602, filed October 20, 1949, in the name of William T. Dye, Jr., which invention is assigned to the same assignee as is the present case.

The present process may be carried out as an intermittent (batch) process, or as a continuous operation. In the latter case, the reactants may be added to the reaction vessel continuously and the product withdrawn continuously at such a rate as to maintain the volume of material undergoing reaction substantially constant. The reaction zone or vessel may comprise a single zone or a plurality of zones arranged in series through which the reactants flow. Each zone may be provided with a reflux condenser and a source of heat. The inert solvent may, if desired, be added through the reflux condenser in such a way as to contact the liberated gases for the purpose of returning to the reaction mass any phosphorus trichloride, alcohol or dialkyl phosphite contained in these gases. The by-product hydrogen chloride (and low boiling alkyl chlorides) leaving the reaction zone are available for recovery since they are obtained at atmospheric pressure.

The hydrocarbon solution containing the product dissolved therein is subjected to distillation in order to recover the contained hydrocarbon. The dialkyl phosphite, if distillable below its decomposition temperature, may be distilled in the usual manner. If undistillable, by reason of its high boiling point, it may be purified by washing with cold water in order to hydrolyze any chlorine-containing compounds. The water solution is separated and dried. As obtained in this manner, the dialkyl phosphite is generally sufficiently pure for most purposes for which it may be used.

Example 1

Twelve gallons of hexane and 65.7 pounds of phosphorus trichloride (0.5 pound mole) were charged to a 25 gallon, glass-lined, reaction vessel provided with a reflux condenser. The hexane-$PCl_3$ solution was heated until the hexane refluxed gently, at which time there was added, as rapidly as possible, 66.2 pounds of alcohol (1.37 pound moles ethanol+0.18 pound mole water). Refluxing was continued after all of the alcohol had been added in order to remove any remaining hydrogen chloride. The hexane was then distilled at atmospheric pressure from the reaction mixture until a pot temperature of 100° C. was reached. A vacuum of 15–25 mm. Hg was then applied to the system after the kettle contents had been cooled to 60° C. The diethyl phosphite was distilled from the pot after first removing a small amount of lower boiling material.

The yield of substantially pure diethyl phosphite was 86.2% based on $PCl_3$ and 68.7% based on ethanol.

Example 2

To a glass flask equipped with a reflux condenser there was charged 122.8 g. (1.4 moles) of n-hexane and 139.2 g. (1.0 mole) of phosphorus trichloride. The hexane-$PCl_3$ mixture was heated until the hexane was refluxing gently and then there was added 140.0 g. (3.0 moles) of absolute ethanol. Then after refluxing for one-half hour the hexane was removed by distillation at atmospheric pressure which required a pot temperature of 100° C. The contents of the flask was then cooled to 60° C., a vacuum of 15–25 mm. Hg applied and the diethyl phosphite distilled.

The yield of diethyl phosphite was 92.8% based on phosphorus trichloride and 61.8% based on ethanol.

Example 3

135.8 g. (1.6 moles) of n-hexane and 144.6 g. (1.1 moles) of phosphorus trichloride was charged to a glass flask equipped with a reflux condenser. The hexane-$PCl_3$ mixture was then heated until the hexane was refluxing gently and then there was added 130.4 g. of 2-B alcohol (2.6 moles of ethanol+0.5 mole of water). After refluxing for one-half hour the hexane was removed by distillation, the content of the flask cooled, a vacuum corresponding to 15–25 mm. Hg applied and the diethyl phosphite distilled. The formula for 2-B alcohol is given in Lange's Handbook of Chemistry, 7th edition, 1949 on page 1748.

The yield of diethyl phosphite was 86.2% based on phosphorus trichloride and 68.7% based on ethanol.

Example 4

295.1 g. (1.9 moles) of carbon tetrachloride, 143.8 g. (1.1 moles) of phosphorus trichloride was placed in a glass flask equipped with a reflux condenser. The carbon tetrachloride-phosphorus trichloride mixture was heated until the carbon tetrachloride was refluxing gently, at which time there was added 129.0 g. of 2-B alcohol (2.6 moles ethanol+0.5 mole of water). At the end of one-half hour refluxing, the carbon tetrachloride was distilled from the reaction mixture, followed by the diethyl phosphite, the latter being distilled off under a vacuum corresponding to 15–25 mm. Hg pressure.

The yield of diethyl phosphite was 82.2% based on phosphorus trichloride and 65.7% based on ethanol.

Example 5

148.2 g. (1.7 moles) of n-hexane and 141.4 g. (1.0 mole) of phosphorus trichloride was placed in a glass flask equipped with a reflux condenser. The mixture was heated until the hexane was refluxing gently and then there was added 98.8 g. (3.1 moles) of methanol. After about one-half hour of refluxing, the hexane was distilled from the reaction mixture at atmospheric pressure, a vacuum was applied to the flask, and the product was removed by distillation at an absolute pressure of 15–25 mm. Hg.

The yield of dimethyl phosphite was 70.2% based on phosphorus trichloride and 46.8% based on methanol.

Example 6

149.8 g. (1.7 moles) of n-hexane and 139.9 g. (1.0 mole) of phosphorus trichloride was placed in a glass flask equipped with a reflux condenser. The hexane-phosphorus trichloride mixture was heated until hexane was refluxing gently, then there was added 183.2 g. (3.0 moles) of isopropanol. Refluxing was continued for one-half hour after all of the alcohol had been added. At the end of one-half hour the hexane was distilled off at atmospheric pressure, followed by the di- uum corresponding to 15–25 mm. of mercury pressure.

The yield of diisopropyl phosphite was 90.5% based on the phosphorus trichloride and 60.3% based on isopropanol.

Example 7

141.2 g. (1.6 moles) of n-hexane and 141.5 g. (1.0 mole) of phosphorus trichloride was charged to a glass flask equipped with a reflux condenser. The hexane-$PCl_3$ mixture was heated to a refluxing temperature, whereupon 229.0 g. (3.1 moles) of n-butanol was added. Refluxing was continued for approximately one-half hour, whereupon the hexane was distilled from the reaction mixture at atmospheric pressure until a pot temperature of 100° C. was reached. The reaction mixture was then cooled to 60° C., a vacuum of 15-25 mm. of mercury absolute pressure was applied, and the di(n-butyl) phosphite was distilled therefrom.

The yield of di-(n-butyl) phosphite was 86.7% based on phosphorus trichloride and 57.7% based on n-butanol.

What we claim is:

1. The process for producing a dialkyl phosphite which comprises mixing and reacting together in the presence of a boiling and refluxing inert solvent at a temperature above 30° C., but below 150° C., phosphorus trichloride and a material selected from the class consisting of (a) at least 3 moles of an anhydrous monohydric aliphatic alcohol per mole of phosphorus trichloride and (b) at least 2 moles of a monohydric aliphatic alcohol and not more than one mole of water per mole of said phosphorus trichloride.

2. The process for producing a dialkyl phosphite which comprises mixing together in the presence of a boiling and refluxing inert solvent at a temperature above 30° C., but below 150° C., phosphorus trichloride and an anhydrous monohydric aliphatic alcohol in the proportion to supply at least 3 moles of said anhydrous alcohol per mole of phosphorus trichloride.

3. The process for producing a dialkyl phosphite which comprises mixing together in the presence of a boiling and refluxing inert solvent at a temperature above 30° C., but below 150° C., phosphorus trichloride and a monohydric aliphatic alcohol and water in molar ratio of at least 2 moles of said alcohol and not more than one mole of water per mole of phosphorus trichloride.

4. The process for producing a dialkyl phosphite which comprises mixing and reacting together in the presence of a boiling and refluxing inert solvent at a temperature above 50° C., but below 80° C., phosphorus trichloride and a material selected from the class consisting of (a) at least 3 moles of an anhydrous monohydric aliphatic alcohol per mole of phosphorus trichloride and (b) at least 2 moles of a monohydric aliphatic alcohol and not more than one mole of water per mole of said phosphorus trichloride.

5. The process for producing a dialkyl phosphite which comprises mixing and reacting together in the presence of a boiling and refluxing inert solvent at a temperature above 50° C., but below 80° C., phosphorus trichloride and an anhydrous monohydric aliphatic alcohol in the proportion to supply at least 3 moles of said anhydrous alcohol per mole of phosphorus trichloride.

6. The process for producing a dialkyl phosphite which comprises mixing together in the presence of a boiling and refluxing inert solvent at a temperature above 50° C., but below 80° C., phosphorus trichloride and a monohydric aliphatic alcohol and water in the ratio of at least 2 moles of said alcohol and not in excess of one mole of water per mole of phosphorus trichloride.

7. The process for producing a diethyl phosphite which comprises mixing and reacting together in the presence of a boiling and refluxing hydrocarbon at a temperature above 50° C., but below 80° C., phosphorus trichloride and anhydrous ethanol in the proportion to supply at least 3 moles of said ethanol per mole of phosphorus trichloride.

8. The process for producing diethyl phosphite which comprises mixing together in the presence of a boiling and refluxing hydrocarbon at a temperature above 50° C., but below 80° C., phosphorus trichloride, at least 2 moles of ethanol and not more than one mole of water per mole of said phosphorus trichloride.

9. The process for producing diethyl phosphite which comprises mixing together in the presence of a boiling and refluxing inert liquid solvent at a temperature above 30° C., but below 150° C., phosphorus trichloride and a mixture of ethanol and water, said mixture containing at least 2 moles of ethanol, but not in excess of one mole of water per mole of phosphorus trichloride.

References Cited in the file of this patent

UNITED STATES PATENTS

| Number | Name | Date |
|---|---|---|
| 1,766,720 | Nicolai | June 24, 1930 |
| 2,005,619 | Graves | June 18, 1935 |
| 2,133,310 | Shuman | Oct. 18, 1938 |
| 2,177,757 | Vanderbilt | Oct. 31, 1939 |
| 2,409,039 | Hardy et al. | Oct. 8, 1946 |

FOREIGN PATENTS

| Number | Country | Date |
|---|---|---|
| 601,210 | Great Britain | Apr. 30, 1948 |

OTHER REFERENCES

Jaehne, Liebig's Annalen, vol. 256, pp. 269, 270 (1890).